(12) United States Patent
Washburn et al.

(10) Patent No.: US 9,707,835 B2
(45) Date of Patent: Jul. 18, 2017

(54) EFFICIENT VEHICLE POWER SYSTEMS

(75) Inventors: Robert D. Washburn, Georgetown, KY (US); Robert F. McClanahan, Valencia, CA (US); Arlene E. McClanahan, legal representative, Saugus, CA (US)

(73) Assignee: 3B TECHNOLOGIES II, Acworth, GA (US)

( * ) Notice: Subject to any disclaimer, the term of this patent is extended or adjusted under 35 U.S.C. 154(b) by 1056 days.

(21) Appl. No.: 13/481,360

(22) Filed: May 25, 2012

(65) Prior Publication Data

US 2012/0249022 A1    Oct. 4, 2012

Related U.S. Application Data

(63) Continuation-in-part of application No. 12/060,820, filed on Apr. 1, 2008, now abandoned.

(51) Int. Cl.
*H02P 7/00* (2016.01)
*B60K 5/08* (2006.01)
*B60K 1/02* (2006.01)
*B60L 11/12* (2006.01)
*B60K 25/02* (2006.01)

(52) U.S. Cl.
CPC ............... *B60K 5/08* (2013.01); *B60K 1/02* (2013.01); *B60L 11/123* (2013.01); *B60K 2025/022* (2013.01); *Y02T 10/6217* (2013.01); *Y02T 10/648* (2013.01); *Y02T 10/7005* (2013.01); *Y02T 10/7077* (2013.01)

(58) Field of Classification Search
CPC ......... B60K 6/46; B60W 10/06; B60W 10/08; Y02T 10/6286
See application file for complete search history.

(56) References Cited

U.S. PATENT DOCUMENTS

| | | |
|---|---|---|
| 2,647,372 A | 8/1953 | Rudston Fell |
| 3,543,518 A | 12/1970 | Shibata |
| 3,600,906 A | 8/1971 | Schultz |
| 3,691,579 A | 9/1972 | Kasper |
| 3,841,108 A | 10/1974 | Pierrat |
| 4,165,795 A | 8/1979 | Lynch et al. |

(Continued)

FOREIGN PATENT DOCUMENTS

WO    WO-2005-097536    10/2005

*Primary Examiner* — Shawki S Ismail
*Assistant Examiner* — Zoheb Imtiaz
(74) *Attorney, Agent, or Firm* — Cislo & Thomas, LLP

(57) ABSTRACT

An improved gas-electric power delivery system is provided. The invention provides an array of internal combustion engine-powered electric generators and an array of electric drive motors wherein each electric drive motor connects to a common shaft. The common shaft of the electric drive motor array connects to a mechanical load of varying power demand. The electric drive motors draw power from a battery in response to demands on the motors by the varying power demands of the external load. The array of electric generators charges the battery and each such generator turns on and off, as needed, to maintain the battery charge in response to demands on the battery by the electric drive motor array. Each electric motor connected to a common shaft in the electric motor array also turns on and off, as needed, to meet the varying power demands of the external load.

7 Claims, 10 Drawing Sheets

(56) References Cited

U.S. PATENT DOCUMENTS

| | | | | |
|---|---|---|---|---|
| 4,829,850 | A | * | 5/1989 | Soloy ...................... B64D 7/00 248/554 |
| 5,655,370 | A | | 8/1997 | Folsom et al. |
| 5,726,551 | A | * | 3/1998 | Miyazaki ............ B60L 11/1803 320/104 |
| 6,179,078 | B1 | | 1/2001 | Belloso |
| 6,876,098 | B1 | | 4/2005 | Gray, Jr. |
| 8,424,624 | B2 | * | 4/2013 | Oyama .................. B60K 6/365 180/65.265 |
| 9,193,268 | B2 | * | 11/2015 | Kumar ................ B60L 11/1801 |
| 2006/0119177 | A1 | * | 6/2006 | Kumar .................... B60L 1/003 307/9.1 |
| 2006/0283350 | A1 | * | 12/2006 | Kumar .................... B60L 11/08 105/26.05 |
| 2008/0015760 | A1 | | 1/2008 | Yamauchi |
| 2008/0219866 | A1 | * | 9/2008 | Kwong .................... B60K 6/46 417/410.1 |
| 2008/0270023 | A1 | * | 10/2008 | Kumar .................... B60L 11/12 701/22 |
| 2009/0242301 | A1 | * | 10/2009 | McClanahan ............ B60K 5/08 180/69.6 |

\* cited by examiner

304
Drive
Belt

Legend

351: Idler Pulley
352: Idler Pulley
353: Water Pump (Composit with 354) Pulley
354: Radiator Fan (Composit with 353) Pulley
355: Crankshaft Pulley
356: Power Steering Pulley
357: Air Conditioning Compressor Pulley
358: Alternator Pulley

600

EFFICIENT VEHICLE POWER SYSTEMS

CROSS-REFERENCE TO RELATED APPLICATIONS

This patent application is a continuation-in-part of U.S. Non-Provisional patent application Ser. No. 12/060,820 filed Apr. 1, 2008 now abandoned for Efficient Vehicle Power Systems, which application is incorporated in its entirety herein by this reference.

BACKGROUND OF THE INVENTION

Technical Field

This disclosure relates generally to motive power systems and more particularly to a method, system and process for improving efficiency by matching power to load requirements during motive vehicular use.

Background

For a typical moving vehicle at lower speed levels, rolling resistance is a predominant loss mechanism providing a nearly linear relationship between power increases and speed increases as shown in the typical power versus speed profile for a vehicle under an operating condition set forth in FIG. 1. At higher speed levels, air drag becomes a factor as well and those losses show a non-linear relationship. A well-accepted measure of vehicle fuel efficiency for automobiles is and has traditionally been "miles per gallon" (MPG). Since the shape of the curve in FIG. 1 is dominated by external factors, improvements have translated into increased fuel efficiency. Examples include improved aerodynamics to reduce high-speed drag and less vehicle weight to reduce rolling resistance.

FIG. 2 illustrates typical engine efficiency versus engine output power under an operating condition. A level of output power is required to maintain engine operation, a portion of which is used internal to the engine. Fuel injection has improved combustion control and, together with improved materials and manufacturing capability, has allowed equivalent power production in physically smaller engines, often with fewer cylinders. Resulting fuel efficiency improvements have been somewhat offset by pollution control requirements that typically reduce overall fuel efficiency.

Traditional automobile power systems are functionally depicted in FIG. 3, and have remained largely unchanged since the internal combustion engine (ICE) became the industry standard in the early 1900s. The inclusion of a fuel consuming auxiliary engine that (if operated in conjunction with a main engine) consumes fuel, in addition to the fuel consumed by a main engine, for selectively powering one or more devices or systems such as a pump, heater, generator or an air conditioner is known.

Traditional vehicle power systems similar to those depicted in FIG. 3 are a determinant to the fuel efficiency. FIG. 2 shows the typical efficiency of internal combustion engines as a function of said engine output power. Maximum efficiency is achieved as the engine approaches but at a point below maximum engine output power capability.

Definitions

Controller means a device that controls operation of a motor or other device by supplying the motor or other device with one or more control signals or electrical power forms. (Control signal or electrical power form characteristics that provide control can include but are not limited to voltage, current, frequency, phase, impedance, and duty factor).

Main Engine means the internal combustion engine that provided power for all loads of a conventional vehicle power system. A characteristic of a main engine is that its size and output is determined by the total peak power needs for a vehicle.

Motive Loads means a load directly related to providing power to vehicle wheels, propellers or props.

Non-Motive Loads means all loads that are not motive loads.

Engine Loads means a subset of non-motive loads internal to an engine.

Engine Support Non-Motive Loads means a subset of non-motive loads, which are external to the engine and support engine function.

Other Non-Motive Loads means a subset of non-motive leads which do not support engine function.

Auxiliary Subsystems means systems that produce other non-motive loads.

Engine Subsystems means systems that produce engine loads.

Engine Support Subsystems means systems that produce engine support non-motive loads.

BRIEF SUMMARY OF INVENTION

The loads 104 affecting the efficient use of fuel in a vehicle (see FIG. 3) vary during use, topography, distance, time, weather, and speed in response to a variety of real world driving conditions. For purposes of this disclosure, the loads have been grouped in limited ways so as to simplify and illustrate a method and system of matching and balancing the load to power ratio for all loads, a subset of a group of loads and for both substantially fixed and substantially variable loads. The groupings are not intended to be limiting. Those of ordinary skill in the art will recognize that a plethora of possible grouping combinations may be developed without departing from the scope of the disclosure. One division is illustrated in FIG. 4. Loads 104 are divided into motive loads 105 and non-motive auxiliary loads 106 (which are the non-motive loads that are not located internal to main engine 102). Non-motive auxiliary loads 106 may be further divided into Engine support non-motive loads 108 (such as water pump 306) and other non-motive loads 110 (such as A.C. compressor 310). Other non-motive loads may be grouped into variable RPM loads 112 and fixed RPM loads 114.

In the past, only a few non-motive loads 106 were present, comprising engine loads and engine support loads 108 necessary to operate the engine. Today, in addition to the engine loads and engine support loads 108, one will find a plethora of other non-motive loads 110 devoted to computers, imaging, telemetry, lighting, communications, navigation, individual occupant environmental control, entertainment systems, electric seat heaters, defoggers, plug-in charging for the gamut of electronic devices, power assisted windows, seats, steering, braking, and suspension stabilization, all of which are loads on the vehicle power system.

The explosion of non-motive auxiliary loads found in modern vehicles calls into question the very concept of whether MPG remains an accurate measure of fuel efficiency. These auxiliary loads have increased to a point where a significant amount of fuel is consumed providing power for these auxiliary loads 112. As illustrated in FIG. 5, activation of an auxiliary load such as the air conditioning compressor will both increase engine output power and reduce vehicle fuel economy. Additionally, as illustrated in FIGS. 6A & 6B, off-peak engine loads are far below that of peak power output. Yet, a conventional power system utilizes an engine with sufficient potential to individually deliver peak power. The fuel efficiency of such an engine is low when that engine is providing power for off-peak engine loads. Stated in a slightly different fashion, conventional vehicle power systems, operated under off-peak conditions, will require only a small fraction of their maximum power output but at a very reduced efficiency.

Total fuel consumption (gallons, pounds, etc.) should not be confused with engine efficiency or fuel efficiency. Fuel consumed is greatest at maximum power output, and is substantially greater than that consumed under typical loading, which in turn is substantially greater than that consumed at minimum loading (engine at idle with no vehicle motion and no auxiliary systems functioning other than those required for the engine to operate).

An efficient vehicle power system (EVPS) can be viewed as one which, under identical loading (operating and/or performance criteria), consumes significantly less fuel than a conventional power, system of high output power capability. Another characteristic of an EVPS is that larger reductions in fuel consumption coincide with the most frequently encountered loading conditions (typical or average loading). For example, based on the engine efficiency and fuel consumption characteristics described above, an EVPS could be configured such that under typical loading (operating and/or performance criteria), power was provided by a small engine (comparably sized to the typical load). This small engine should therefore have both high efficiency and low fuel consumption for typical vehicle loading). Output power from said small engine could be combined with other small engines to produce the required higher average power.

The present disclosure is an efficient vehicle power system for converting potential energy stored within any of a wide variety of chemical molecules (fuel) into useful work wherein said conversion occurs over a wide, dynamic range of system operating loads, and where typical (average) system load power is substantially below the peak output power capability of said conversion system. The present disclosure describes power conversion for a wide variety of portable and mobile applications which addresses matching between power source characteristics and load conditions.

Conventional vehicle power system efficiency characteristics are illustrated in FIG. 6A as they relate to the output power range of the system and the power required for vehicle operation under typical (average) conditions. The superior profile EVPS has a wider range of output power (at both maximum and minimum output power levels) and increased efficiency everywhere compared to the present art. At maximum power, the combined maximum power from the array of small engines is greater than or equal to that from a single large engine. Fuel efficiency is improved everywhere across the range of power outputs because the more fuel efficient small engine provides a portion of the load power ranging from a large portion at low, power system output to a smaller portion at high power system output. Furthermore, the greatest percentage improvement, represented by difference between the curves, is in the region representing typical vehicle operation.

The present disclosure is an EVPS for converting potential energy stored within any of a wide variety of chemical molecules (fuel) into useful work wherein said conversion occurs over a wide, dynamic range of system operating loads, and where typical (average) system load power is substantially below the peak output power capability of said conversion system. Exemplary implementations of the present disclosure provide low cost realization of efficiency profiles that conform to the superior profile of FIG. 6B. The present disclosure describes power conversion for a wide variety of portable and mobile applications and addresses matching between power source characteristics and load conditions.

In some exemplary implementations, two or more small, high efficiency engines are in a EVPS and comprise an array of engines.

In some exemplary implementations, the present disclosure matches the different loads or combinations of loads to an appropriate array of engines thereby utilizing the fuel more efficiently.

In some exemplary implementations, the present disclosure includes two or more engines whose combined output power equals or exceeds that of a conventional single engine using identical fuel and providing power to identical vehicle loads, and where at least one of the multiple engines has lower maximum output power capability than the common single engine configuration.

In some exemplary implementations, the present disclosure includes two or more engines whose combined output power equals or exceeds that of a single conventional engine system using identical fuel and providing power to identical vehicle loads.

In some exemplary implementations, vehicle fuel efficiency is improved by more closely matching the output power capability of one or more power array sources to individual load requirements at the point in time when the required load power is being delivered.

In some exemplary implementations, two or more small capacity engines provide substantially all vehicle mobility power under vehicle operating conditions substantially less than full power.

In some exemplary implementations, an EVPS uses mechanical means for combining output power from two or more engines. Typically, said mechanical means are the drive shaft of a multiple electric motor, common rotor assembly for vehicles wherein mobility power is delivered by multiple electric motors.

In some exemplary implementations, an EVPS uses electrical means for combining output power from two or more engines. Typically, said electrical means are electrical alternators, driven by individual small ICEs, which are designed to operate with their outputs connected in parallel, and configured to operate in a master-slave mode.

In some exemplary implementations, one or more small capacity engines provide a substantial portion of vehicle mobility power under vehicle operating conditions substantially less than full power.

In some exemplary implementations, no output power from any on-board fuel-consuming engine is coupled to the vehicle wheel drive system via direct mechanical connection.

In some exemplary implementations, output power from at least one small engine is converted to electrical power used, at least in part, to power electric motors for producing vehicle motion.

In one aspect of this disclosure, a vehicle has two or more electric motors providing mechanical drive power to the vehicle wheel drive system, the motors having a common rotor shaft assembly for mechanical power combining.

In some exemplary implementations of the present disclosure incorporating means for storing electrical energy sufficient to provide maximum power to vehicle loads, the required duration of maximum power delivery from said means of electrical energy storage is typically minimal, rarely more than a few minutes. The limited duration permits substantial reductions in the size; weight and cost of said means of electrical energy storage compared to present art AEVs and HEVs.

In some exemplary implementations, an array of small engines with combined output power capacity sufficient to provide maximum power required for vehicle operation, forms an EVPS. In some aspects, a controller turns-on and turns-off one or more of the small engines in the array responsive to anticipated power requirements calculated from data related to condition and status of said vehicle, route information, location, and external environmental data. In some aspects, one or more sensors for acquisition of data useful for an onboard controller (which may include a computer) to calculate or to use a pre-calculated look-up-table (LUT) to determine near term vehicle power needs and establish a vehicle power system operating configuration (VPSOC) to provide for that power need.

In some exemplary implementations, the present disclosure operates using a fuel selected from the group including all hydrocarbon containing fuels, gasoline, diesel, ethanol, E-85 propane, liquefied natural gas, hydrogen, and other synthetic, blended or bio-fuels.

In some exemplary implementations, the present disclosure is of a fuel efficient method for powering a vehicle, the method comprising identifying the total peak power requirements for a vehicle under a set of performance criteria.

In some aspects of the present disclosure, two or more small engines have superior fuel efficiency than a single main engine would have when operating over the same operating delivered power conditions.

In some exemplary implementations of the present disclosure, a load matching method for powering an automobile is disclosed. The method comprising identifying the total motive and non-motive loads for a vehicle under a set of performance criteria. Divide the total loads, which may require power within an automobile during powered movement, into at least two subgroups. Provide an engine array within the automobile, of a size and with a power output sufficient to provide for at least the motive loads; and, within the automobile, of a size and with power output sufficient, to provide for non-motive loads as well.

In some aspects of the present disclosure, during operation of the system the motive power demands of the automobile on the average are between about 1 and about 95 percent of the maximum capacity of the primary standard engine configuration.

In some aspects of the present disclosure, during operation of the system the non-motive power demands of the automobile on the average are between about 1 and about 95 percent of the capacity of the total engine array system capability.

In some aspects of the present disclosure, non-motive power demands of the automobile are up to about 90 percent of the capacity of the engine array system.

The features and aspects of the present disclosure will be better understood from the following detailed descriptions, taken in conjunction with the accompanying drawings, all of which are given by illustration only, and are not limitative of the present disclosure.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION OF THE INVENTION

The detailed description set forth below, or elsewhere herein, including any charts, tables, or figures, is intended as a description of presently-preferred embodiments of the invention and is not intended to represent the only forms in which the present invention may be constructed or utilized, nor is it intended to limit the scope of any claims based thereon.

In the following description various exemplary implementations, aspects and characteristics are discussed as directed toward vehicular and particularly automotive applications. The focus on automotive applications is not intended to be, nor should it act as, a limitation to the scope of this disclosure, marine, and air vehicles may also benefit from the disclosure. Automotive also includes automobiles and light duty trucks (terrestrial vehicles), which at present most frequently use single, gasoline burning, ICE power systems to provide power to produce vehicle motion and to operate all vehicle auxiliary and support systems. The automotive focus does not imply that the present disclosure is not applicable for use on other types of vehicles including heavy diesel powered trucks and buses, diesel powered train locomotives, and aircraft.

Figure 3:
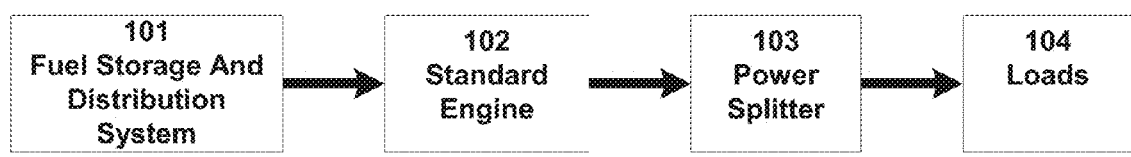
FIG. 3 is a block diagram of a conventional vehicle power system.

A conventional vehicle power system, illustrated in FIG. 3, shows a functional configuration. A single, large, gasoline main engine 102 provides all of the power required by various loads 104, which are managed as a single loss. Main engine output power is split by a power splitter 103 (such as a pulley and belt system attached to the crankshaft of main engine 102), which diverts a limited portion of main engine 102 output power to auxiliary subsystems.

Figure 4:
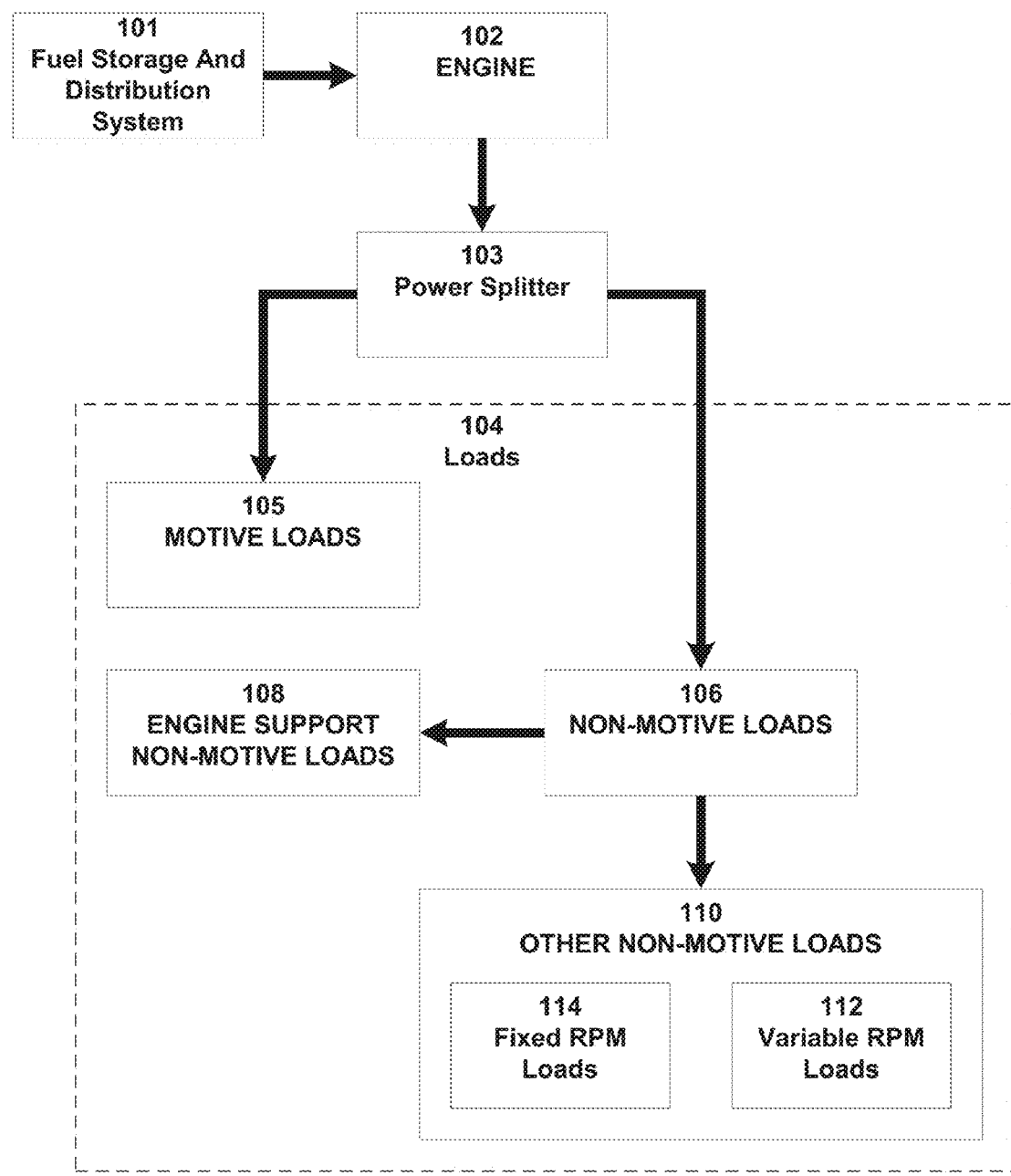
FIG. 4 is a block diagram showing load details for the vehicle power system of FIG. 3.
Figure 5:
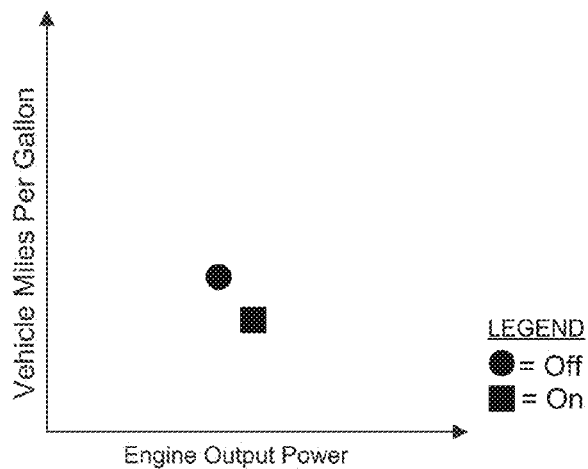
FIG. 5 is a graphical illustration of the change in vehicle MPG and engine output power as a result of operation or non-operation of an optional auxiliary load.
Figure 6A:
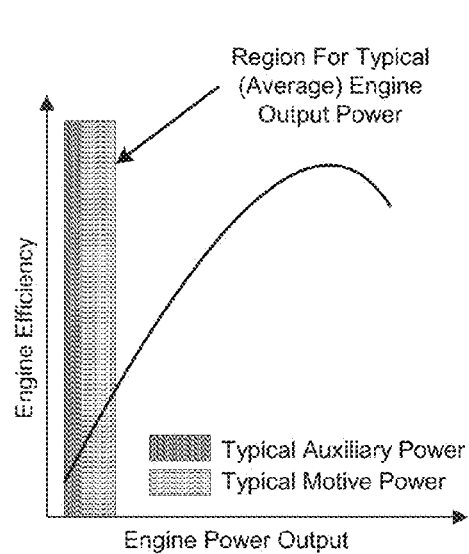
FIG. 6A a graphical illustration of the region of typical (average) output power superimposed upon the graphical illustration of FIG. 2.
Figure 6B:
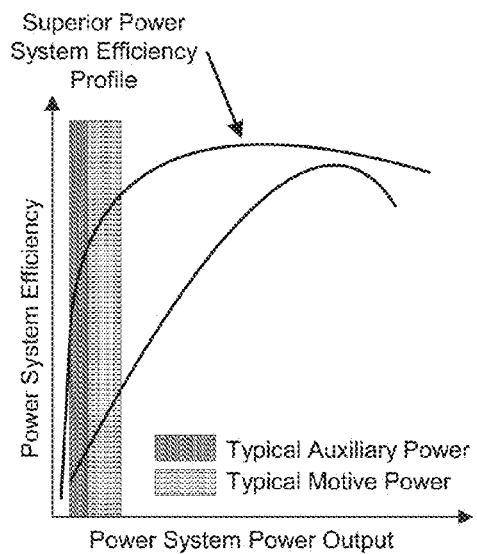
FIG. 6B is a graphical illustration of a superior profile for power system efficiency versus power system output power superimposed upon the graphical illustration of FIG. 6A.

FIG. 4 provides a more detailed view of loads 104. Power splitter 103 directs power to motive loads 105 (load A) for producing vehicle motion and to the non-motive loads 106, which include both engine support non-motive loads 108 and other non-motive loads 110. Subsystems creating engine support non-motive loads 106 can include a water pump (load C), a fuel pump (load J), and a radiator fan (load L). Subsystems creating other non-motive loads can include such items as the electrical system (load B) comprising an alternator, a battery, or other presently known means for electrical energy storage, such as a fuel cell, and the electrical power distribution subsystems; power steering pump (load D), air conditioning compressor (load E), and electrical heaters (load F). Engine loads are internal to main engine 102 and not illustrated. Engine loads can include an oil pump (load G), distributor (load H) and camshaft (load I).

Figure 1:
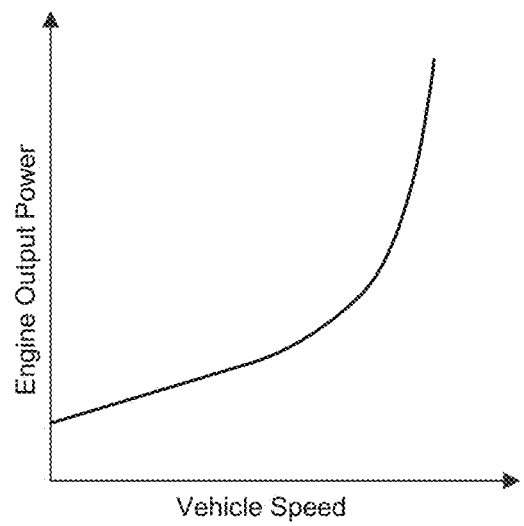
FIG. 1 is a graphical illustration of engine output power versus vehicle speed for a typical vehicle, operating under steady state conditions.
Figure 2:
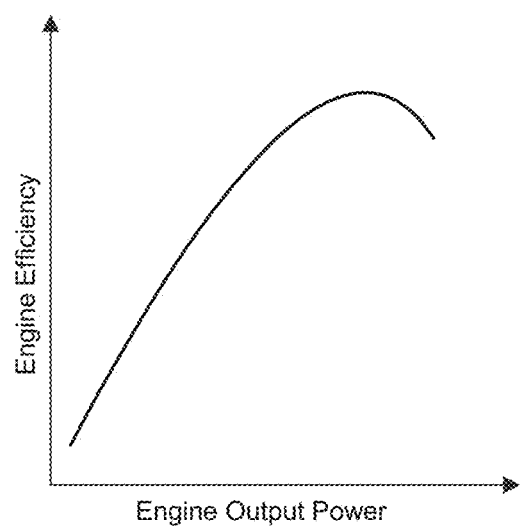
FIG. 2 is a graphical illustration of engine efficiency versus engine output power for a typical vehicle ICE.

Small gasoline engines have a higher efficiency (consume less fuel per horsepower-hour produced) than larger gasoline engines, particularly when the latter are operating at low output power levels (levels substantially less than the engine maximum). For example, a large engine might have a peak efficiency (a high but not maximum power condition per FIG. 2), but under typical load conditions, a large engine might have much less than ¼ its peak efficiency. A small engine might have a peak efficiency that is 5-10 times the efficiency of a large engine when that large engine is throttled down for operation in the common city uses (i.e., in the same operating power range). In general, the small engines will be operating much closer to optimum efficiency than the single Main Engine. Generally, for the same vehicle if one compares a larger engine and smaller engine, operating under performance criteria that include operation within the smaller engines nominal operating range, one will find that the smaller engine is more fuel efficient and normally has reduced pollution produced.

The typical measure of fuel efficiency for a vehicle is in the form of miles per gallon (MPG). U.S. government regulations require two measures in the form of city and highway MPG, measured under and in conformance with regulated test conditions. The result is effectively a figure-of-merit that allows consumers to effectively compare disparate vehicles from disparate manufacturers, even though the mileage they might actually realize is likely to vary (even considerably) from said published measures. Measurement of MPG is a relatively easy task to perform, requiring data input from only an odometer and a fuel flow sensor.

In an actual vehicle as illustrated in FIGS. 3 and 4, loads 104 can be separated into motive loads 105, which is the cumulated engine loading associated with the production of actual vehicle movement, and non-motive loads 106, which are the cumulated loading for other than direct motion producing systems. The non-motive loads include engine support loads 108 that are external to the engine itself and are not included as part of engine overhead operating power loss. The engine support loads 108 are necessary to engine operation and could have been included as part of overhead losses in an alternate system for load characterization.

Engine loads are associated with and include crankshaft drive, camshaft drive and valve operation, oil pump drive, distributor drive, air "breathing", and exhaust gas backpressure. As such, engine loads are clearly not constant and primarily vary with engine RPM. As such, the change in overhead loss between operation at typical loading and full power is relatively small (by a factor of only 2 or 2.5). This largely explains the typical change in engine efficiency versus engine output power shown in FIG. 2. To avoid obscuring the effects of the disclosure, examples in this disclosure will use an overhead loss of four horsepower (hp) unless otherwise indicated.

The impact of engine overhead can be seen in the following example. A vehicle requires 10 horsepower to travel on a level road at 60 miles per hour (MPH) with no wind and an engine overhead loss of 4 horsepower. (Note: air resistance or drag including any wind velocity contribution is a highly nonlinear function of relative air velocity that will be a dominate fuel use factor at high speeds yet be of little significance at low speeds. For even a standard size sport utility vehicle (SUV), 60 MPH typically falls into the top end of the low speed region such that drag can be ignored for this example in favor of linear rolling resistance). Overall engine efficiency (temporarily ignoring all non-motive loads) is power delivered to the wheel drive system divided by total power generated. For this example, engine efficiency is approximately 10/14 or 71.4%, this does not count thermal losses. Operating said vehicle for 1 hour would cover 60 miles. Operating the same vehicle in a lower gear at the same engine RPM could (for purposes of this example) produce a speed of 20 MPH. In this case, engine overhead would remain approximately 4 horsepower but with only 3.3 horsepower delivered to the wheel drive systems (a linear reduction in rolling resistance due to the lower speed) for a total of 7.3 horsepower and an engine efficiency of 45.4%. For a trip of 60 miles, travel at 60 MPH requires 14 horsepower-hours while travel at 20 MPH requires 3 hours and a total of 22 horsepower-hours. Thus vehicle MPG is significantly reduced as a direct result of engine overhead and vehicle MPG decreases with speed reduction to zero when the vehicle is not moving but the engine (and auxiliary loads) remain operating.

The above examples illustrate an important concept (i.e., that, non-motive loads can contribute significantly to overall power consumption even at highway speeds, and such loads may represent a large percentage of engine loading under typical or lower speed driving conditions).

Automobiles and trucks come in a wide variety of sizes, capabilities, and characteristics to satisfy a wide variety of consumer and business needs and desires. The present disclosure can be implemented in whole or in part, and in a wide variety of topologies to meet specified performance and fuel efficiency objectives for a given, specific application.

Figure 10:
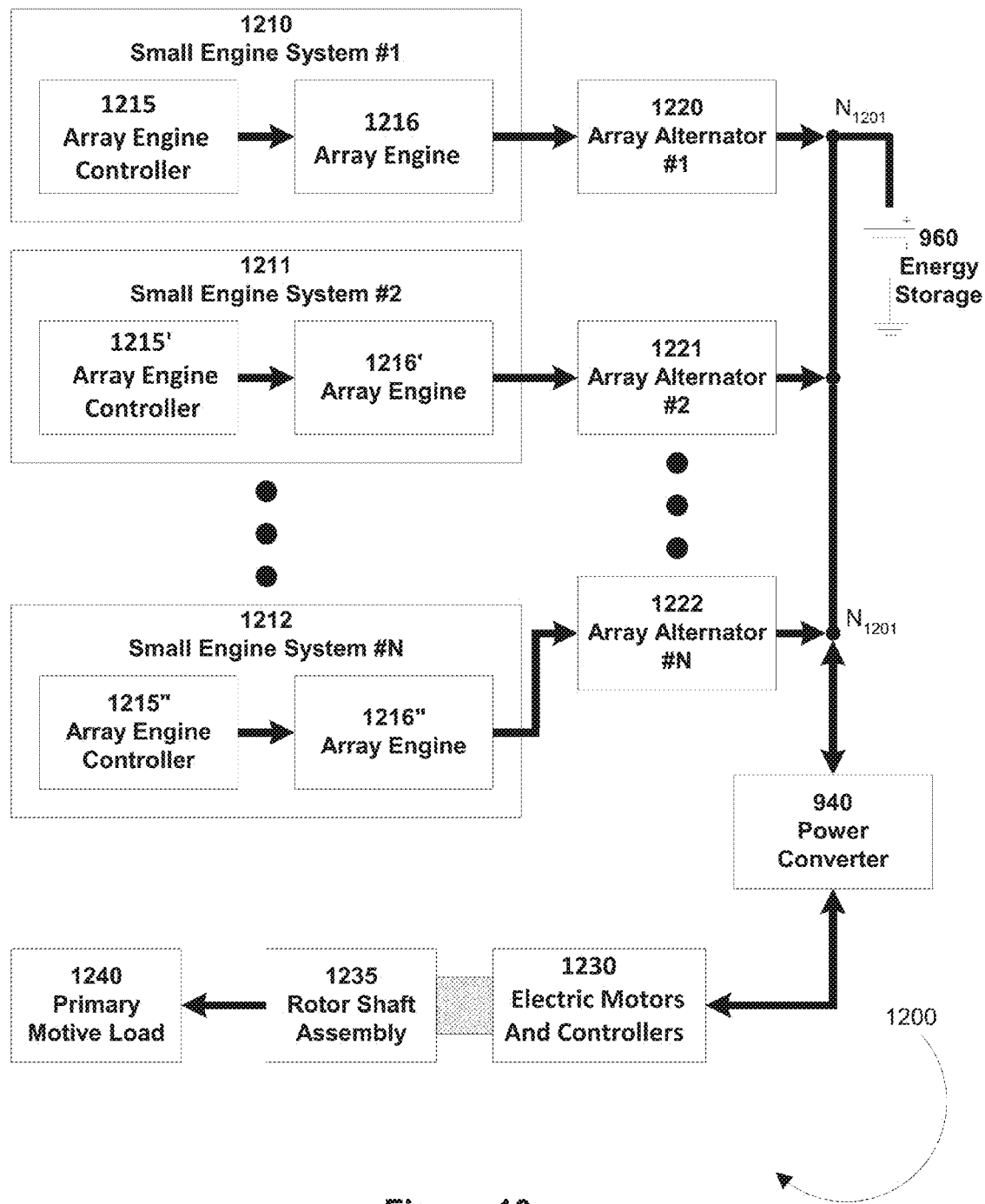
FIG. 10 is a block diagram of one exemplary implementation of primary electric motor array and controllers function of FIG. 9.

One exemplary implementation of a vehicle power system is shown in FIG. 10. A fuel storage and distribution system 101 supplies fuel to more than one fuel-consuming engine. As illustrated, the engine/alternator array 1302 supplies power through a power combiner to the energy storage system 960. Most typically the motive load is the power delivered to a wheel drive subsystem for producing vehicle movement. Motive load is the power actually transferred to the environment through the wheels plus internal power consumed within the wheel drive subsystem.

Figure 7:
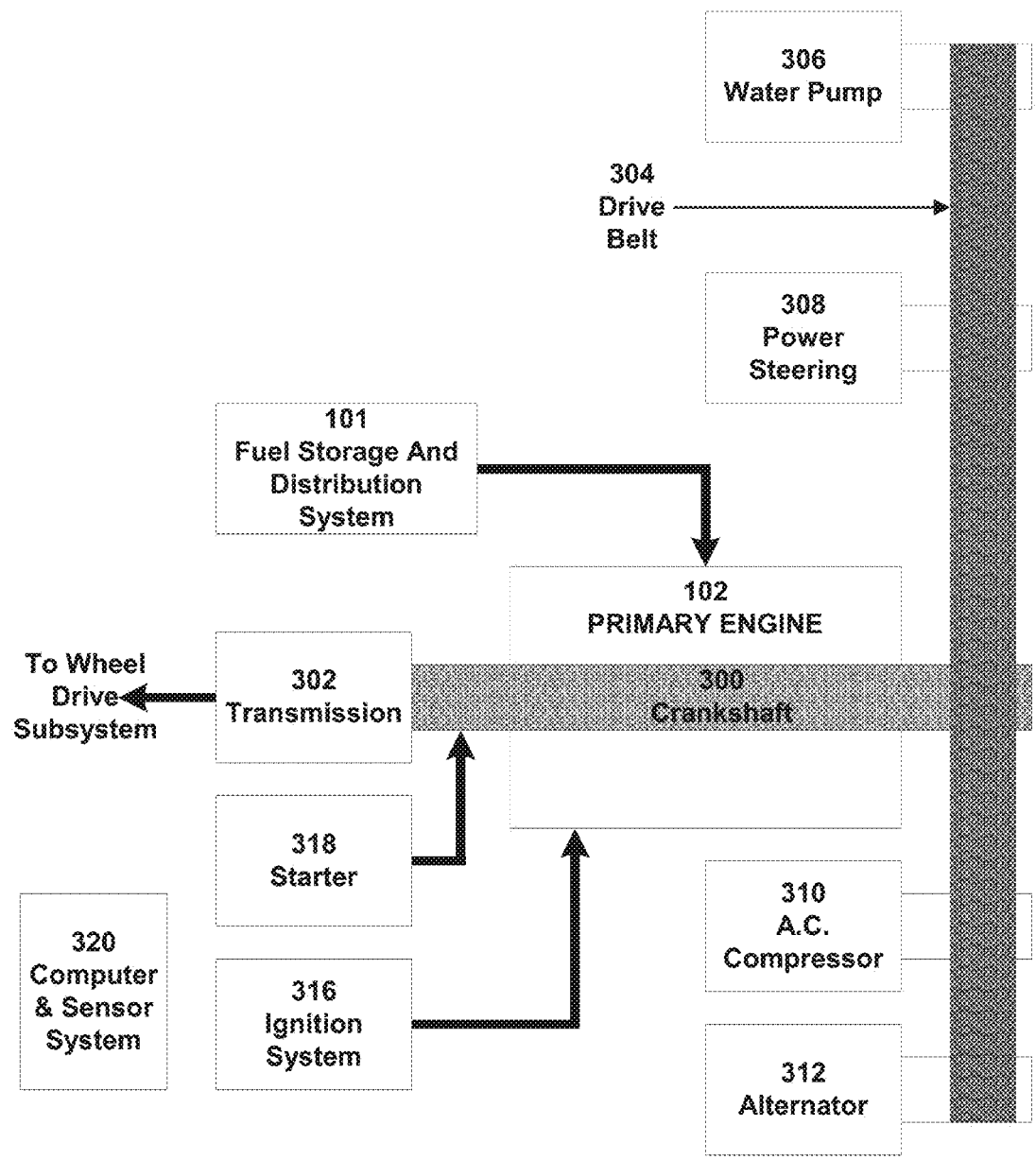
FIG. 7 is a block diagram of a specific, conventional automobile power system.

FIG. 7 is a block diagram of a conventional automotive power system, and is included for the purpose of comparison with exemplary implementations disclosed herein. The conventional engine, main engine 102, provides power through crankshaft 300 to the transmission 302 for producing vehicle movement, and to a drive belt 304 to power auxiliary subsystems including water pump 306, power steering 308, A.C. compressor and alternator 312, The alternator 312 charges the battery and supplies power to many of the other non-motive loads 110 described above which include, but are not limited to, all electricity consuming systems.

Figure 8:
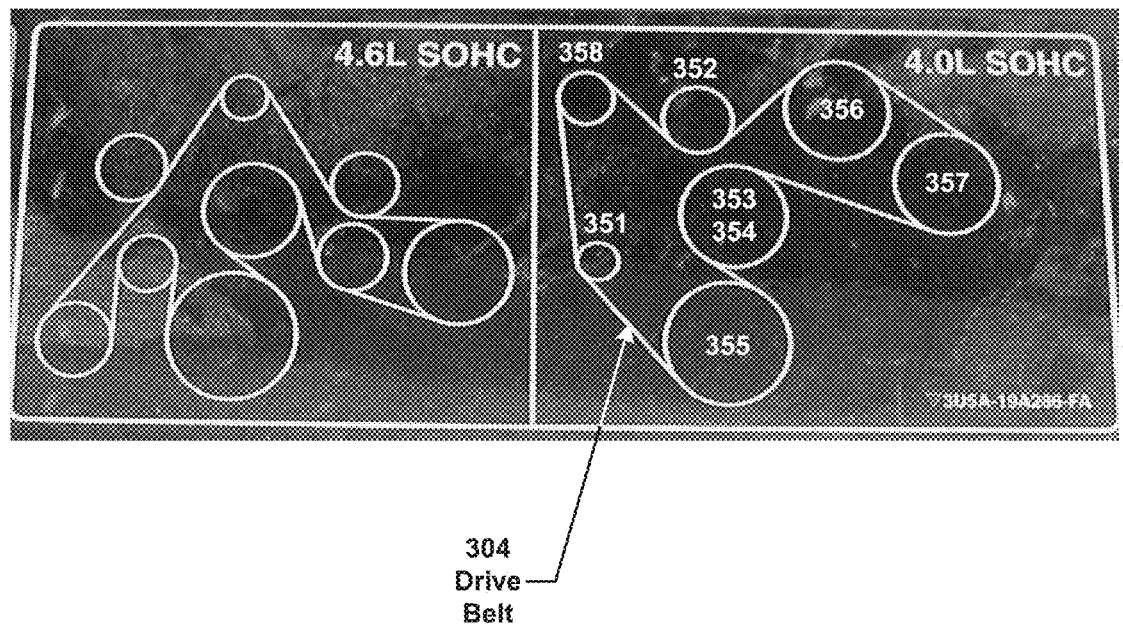
FIG. 8 is a schematic illustration of typical belt and pulley means of power distribution to non-motive loads and other engine loads as implemented for the specific, conventional, automobile power system of FIG. 7.

FIG. 8 shows the specific routing for drive belt 304 for the power system illustrated in FIG. 7. The drive belt 304 transfers a portion of the power produced by main engine 102 and provided through crankshaft pulley 355, to water pump pulley 353, radiator fan pulley 354, power steering pulley 356, air conditioning compressor pulley 357 and alternator pulley 358. Idler pulleys 351 and 351 are present to facilitate routing of drive belt 304 and do not transfer power to an auxiliary subsystem.

Table 1 is an illustration of the benefits of tapering engine size within arrays of small engines and indicates the relative potential benefits that could be achieved with different size small engines in an array. Table 1, discussed in greater detail below, shows that it is clear that: (1) almost any size small engine will improve fuel efficiency compared to a single large engine as is now typically implemented, and (2) optimum improvement is achieved when the small engine array size is configured to match the load. Since the "typical" loading can vary significantly with user and application characteristics, it will be very important for vehicle manufacturers to offer a selection of optional small engine array sizes and configurations, and for users to know both the impact of selected auxiliary systems as well as the manner in which they will typically use the vehicle.

TABLE 1

Impact of Engine Size on Efficiency

| Number of Engines | Total Average motive power (Highway) | Engine Power | Relative Engine Efficiency (Highway) | Total Average motive power (City) | Relative Engine Efficiency (City) |
|---|---|---|---|---|---|
| 1 | 10 | 200 | 1.0 | 5 | 1.0 |
| 1 | 10 | 50 | 1.45 | 5 | 1.6 |
| 1 | 10 | 25 | 1.65 | 5 | 3.5 |
| 1 | 10 | 15 | 2.35 | 5 | 6.38 |
| 2 | 10 | 10 | 2.5 | 5 | 7.5 |
| 3 | 10 | 5 | 3.22 | 5 | 9.6 |
| 7 | 10 | 2 | 4.16 | 5 | 12 |

Direct combining of power from two or more fuel-consuming internal combustion engines, which will be operating at different RPM values, is not a practical approach. By combining the electrical power produced by each individual alternator, one per engine in a master/slave arrangement for reliability purposes approach in as much as each different power engine will have its own peak efficiency point, RPM and torque. Thus, the need for combining the power generated by the individual engine/alternator pairs in a scaled master/slave arrangement is accomplished. This is accomplished on the output of each alternator by scaling the electrical current of the slave alternator to that of the master alternator. Without the scaling, there would be serious stability issues in the system with the lower power alternator trying to output more than it should and thereby moving the slave engine off its peak efficiency point as well.

First, small engines in the array sized below typical load power will not realize all of the benefits the present disclosure envisions. In this case, the undersized engine is likely to be operating continuously at its predetermined maximum power output under high load conditions. Reliability and derating are issues that need be addressed in a specific design application but are not necessary to this disclosure.

Second, it should be noted that for cases where the small engine array is sized to provide more output power than typical load power, the added capability reduces ideal fuel efficiency improvement for typical power output unless the added capability is turned off when not needed. This will be at least partially offset by the fact that the added capacity will provide improved reliability at nominal power level.

Figure 11:
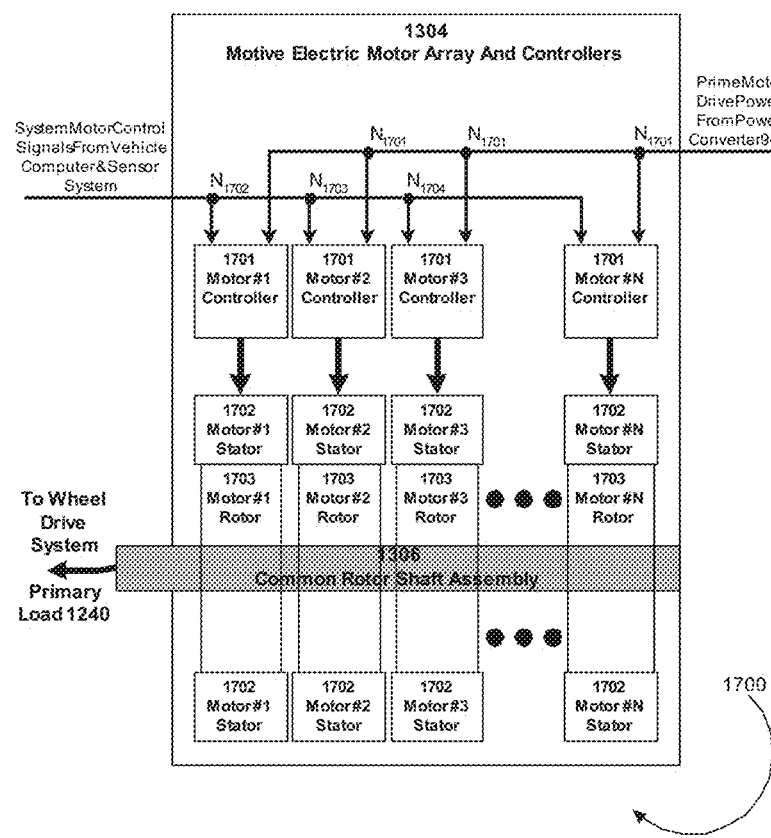
FIG. 11 is a block diagram of one exemplary implementation of a computer and sensor system for dynamically configuring and controlling power systems.
Figure 12:
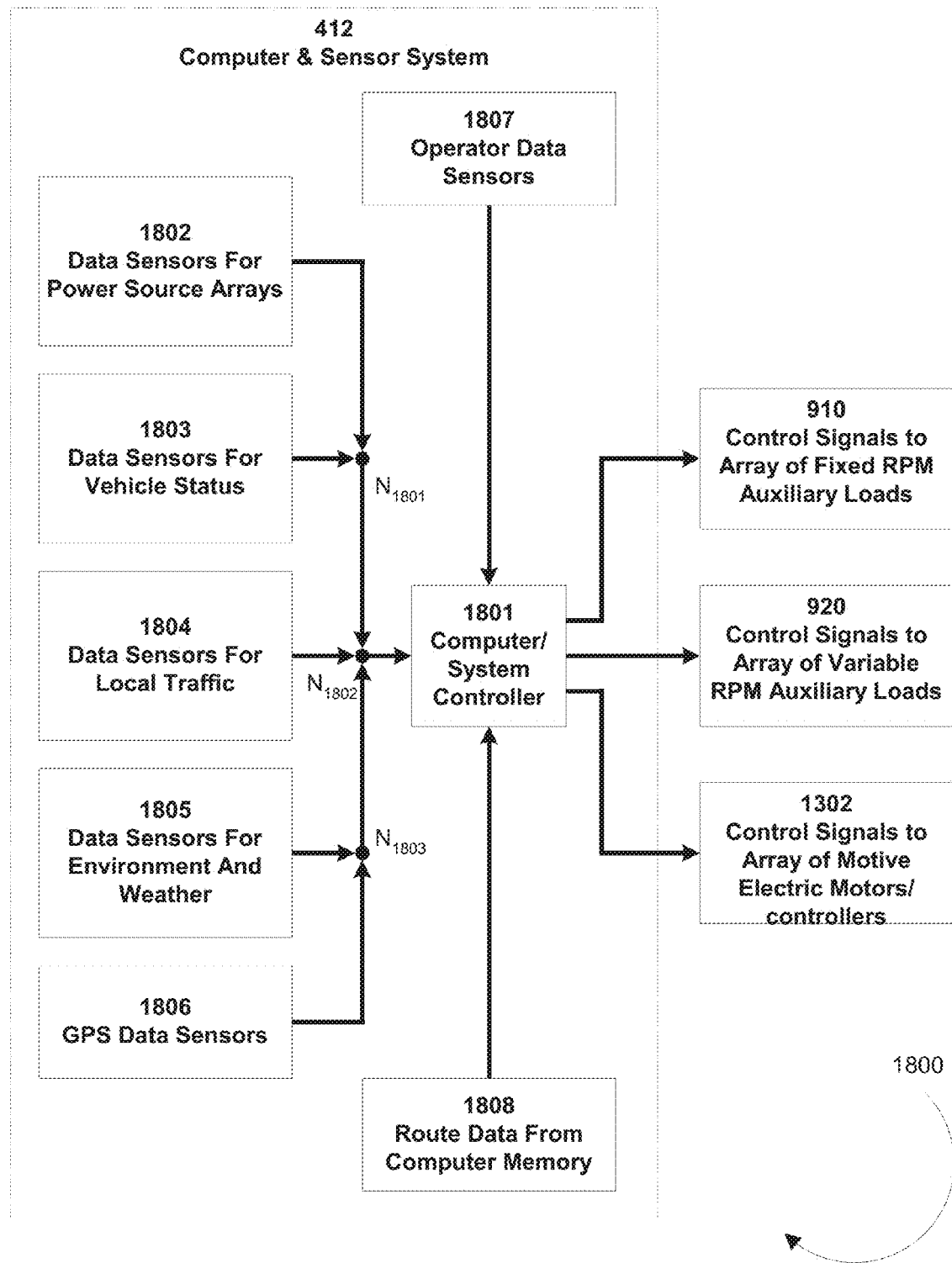
FIG. 12 is a block diagram of a typical car computer showing a multitude of sensors and controls.

Regarding a direct electric motor crankshaft drive, bidirectional connections (shown in FIG. 11) indicate normal, bidirectional energy flow, or specifically, that the disclosure provides energy recovery during vehicle deceleration. Energy recovery can substantially increase fuel efficiency and is a common feature in AEVs and HEVs. Electric motor drive implementations of the present disclosure can be fully compatible with energy recovery. They only require that the electric motors, motor controllers, and energy storage subsystems be capable of returning power to the energy storage subsystem 960 for storage, such as regenerative braking.

Figure 9:
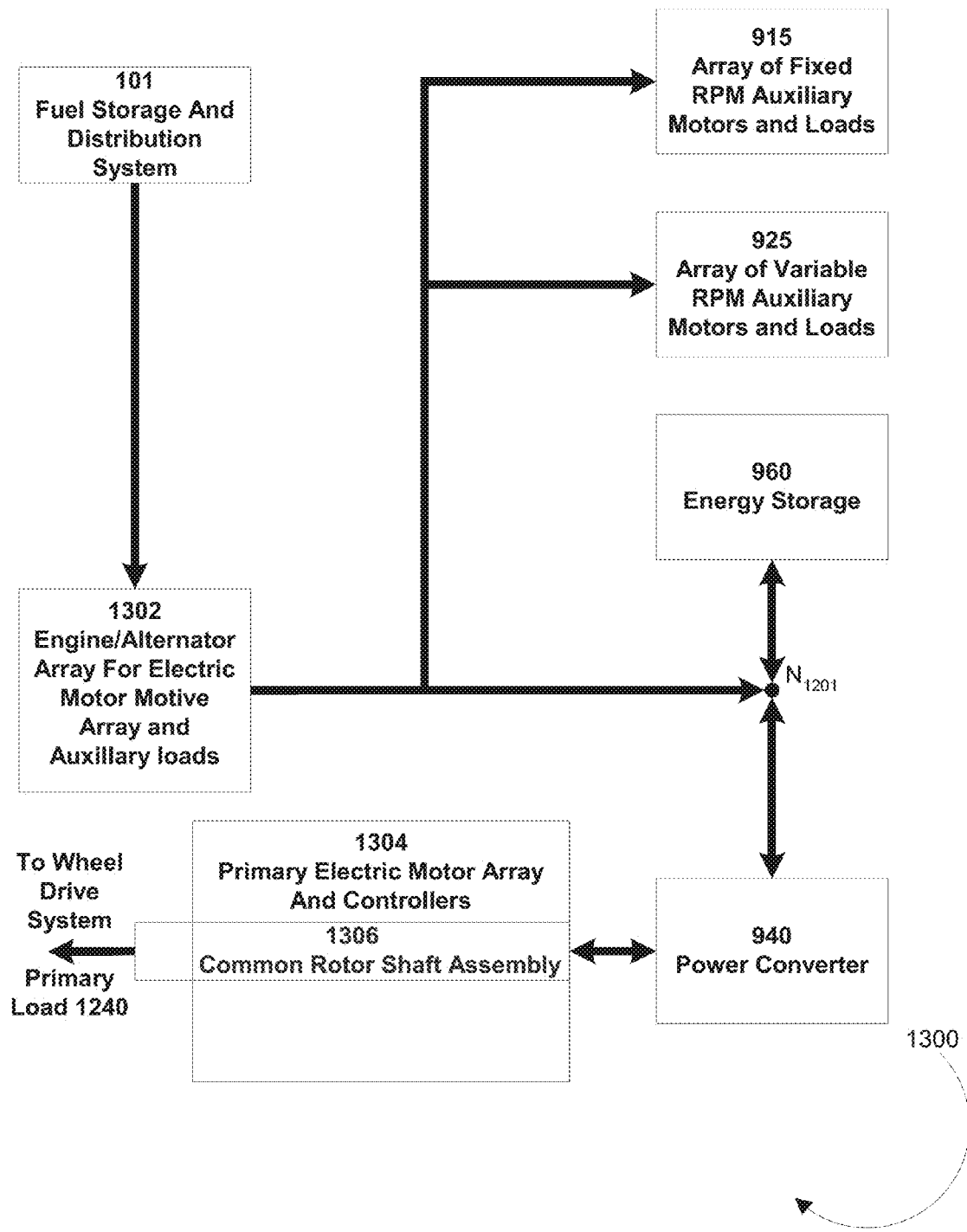
FIG. 9 is a block diagram of one exemplary implementation of the power system of a system having an array of small engines each operating individual alternators providing power to energy storage 960. An array of electric motors directly delivers power for producing vehicle motion and a separate electrical motors provides power to other non-motive mechanical loads.

Regarding a single electric motor drive implementation, a system such as is shown in FIG. 9 may utilize one or more primary electric motors 1304 to provide power to the motive loads identified as primary load 1240 from one or multiple small, fuel efficient ICEs comprising power source array for primary electric motor array 1302, through energy storage 960.

The sizes of the small ICEs comprising any power source array depend on the number of ICEs comprising the array, the maximum and minimum output power to be supplied by the array, and a selected distribution of power ratings for individual ICEs comprising the array. For example, a 200 hp primary engine 203 might be replaced in a SUV by: (1) four 50 hp engines, (2) unequal engine size distribution such as a binary taper of four engines of 13.5 hp, 27 hp, 54 hp, 108 hp; or (3) a mixed configuration of five engines of 13.5 hp, 27 hp, 54 hp, 54 hp and 54 hp, or some other combination. The reason for tapering is that under typical or average load conditions, power source array for primary electric motor array 1304 delivers only a small portion of its maximum capacity, just as with primary engine 203 in previous discussions. Tapering creates the opportunity to deliver required power from a comparably sized source. The potential fuel efficiency benefits of tapering are shown in Table 1 above.

Table 1 is not intended to define any preferred implementation nor specify actual fuel efficiency improvements associated with any particular application. The table is simply to indicate common characteristics and trends that should be taken into account when configuring a power system for any specific application. First, Table 1 shows that, in accordance with the present disclosure, there is substantial potential for fuel efficiency improvement at both light and heavy engine loads using ICE size tapering. Second, the greatest benefit is obtained by reducing the size of the largest engine actually delivering the output power. Finally, the table shows that inclusion of the smaller engines can have a very large impact on overall fuel efficiency and should not be overlooked. The presence of even one small engine that is actually delivering power can have a surprising and unexpected impact.

One potential technique to mitigate space limitations, which may be associated with the total available volume, the location of available volume, or other packaging limitations in vehicles, is to power individual auxiliary loads with individual electric motors. Said electric motors are effectively individual integrated elements of a power-generating array with individually dedicated outputs. One example of such an auxiliary load is A.C. compressor 310. While typically powered mechanically via a pulley and drive belt 304 in conventional vehicles, an A.C. compressor 310 can alternatively receive power from motor, which are is integral to the A.C. Compressor.

When utilizing multiple electric motors and controller 1230, the outputs of auxiliary alternators 1220-1222 must be electrically combined (at node N1201) prior to delivery to energy storage 960 for storage or pass through to electric motor controller 1230. Unlike some other implementation wherein power combining is "done mechanically, power combining in this configuration is done electrically. Regardless of method, the combining of power outputs from two or more sources is a characteristic of this disclosure, whether said power outputs are from multiple ICEs or other elements comprising an array of small power sources.

Combining the DC power outputs from multiple electrical power sources, such as auxiliary alternators 1220-1222, is more complex than simply wiring the outputs together at a common node. In such a simplified connection scheme, normal variations in the regulated output voltage will cause one power source to load down others. The result is some sources turned on hard and others are virtually unloaded. This potential problem is common whenever distributed electrical power conditioning is employed. A common technique to avoid the problem is to designate one of an array of power sources to be a master unit and the others as slaves. The slave units are designed to track the output of the master in terms of voltage regulation and provide a proportionate percentage of the total load current. Proportionality is important since current outputs should not be equal if the small engine sizes (and their associated alternators) are tapered in size. If one of the slave devices fails, the other devices simply take up the slack. Failure of the master device does not render the array inoperable since a properly designed slave device can assume the master function. This approach is referred to as a multi-master/slave approach in which there is a prioritized sequence for slave devices to take over the master task. A major benefit of this approach is its inherent redundancy, and it is commonly used in applications where a single point failure of a power system is unacceptable. Examples include computer server systems with hot swap power supplies, certain medical systems, and a variety of space and oceanographic systems where repair is impractical.

Energy storage 960 is comprised of a combination of one or more batteries having the characteristics and energy storage capacity described above, and capacitors to provide for energy storage to satisfy short term transient load applications, filtering of noise and spurious transient signals, and impedance control for maintaining electronic circuit stability. Like most existing automobiles and unlike energy storage in AEVs and HEVs, energy storage is held primarily as a liquid fuel, which represents an exceptionally efficient means of storage. Energy storage in the batteries is limited to an amount sufficient to provide full performance vehicle operation for a short, predetermined maximum time period, which is related to the intended application. Battery power operation in the nature of minutes will be sufficient to provide several repetitions of high-energy usage such as rapid, uphill acceleration for passing another vehicle in the face of oncoming traffic. A typical automotive ICE can be turned on and provide substantially full output power within a short period, much less than a minute (even for implementations that provide for turn-on and turn-off of ICE array elements). Thus, electrical energy storage for operation of less than about 5-15 minutes results in substantial operating margin without requiring the use of additional large, heavy and/or expensive batteries or arrays of batteries. Lithium ion or nickel metal hydride type rapidly rechargeable batteries or a combination of capacitors and batteries may also be used.

Typically, battery recharging will be accomplished using the ICEs that charge the battery during normal operation. However, nothing in this disclosure prevents recharging from other power sources, for example, from the commercial power grid using an optional plug in capability. Nothing in this disclosure is intended to exclude the vehicle deploying a power system disclosed herein from operating for a significant time on battery power alone. Under these circumstances the vehicle would function in a plug-in hybrid electric vehicle (PHEV) mode with one or more power source arrays either turned-off or powered down for substantial periods of time. This is a particularly useful mode with turn-on/turn-off capable implementations discussed below and allows significant operation even if the vehicle runs out of fuel.

Additionally a single large electric motor could be viewed as a more efficient electric analog to a comparably large ICE. For purposes of this analogy one could choose to view the large electric motor as having its own type of overhead losses associated with largeness thereof. Near rated power, a reasonably efficient electric motor might operate at 95% efficiency while at 10% of rated output power, electric motor efficiency might fall to approximately 60% (or even less).

Major electric motor overhead losses are associated with both the motor controller and the electric motor itself. Controller losses include power semiconductor on-state power dissipation, power semiconductor drive power, and controller internal bias power. Drive power for FET or IGBT type semiconductor devices is independent of the actual load, but depends on the input characteristics of the power semiconductors themselves, which are large so as to be capable of delivering maximum peak engine power. Motor losses typically result from internal wiring losses and the minimum magnetizing current at low power. Furthermore, many systems have an absolute minimum power level for stable operation. Those that can operate at loads down to zero typically must compensate by reducing other capabilities and efficiency is one common candidate. In practice, the capability to operate at zero loading is effectively the same as a synthetic load on the power supply.

To reduce electric motor inefficiencies, it is possible to replace the single large electric motor with an array of two or more smaller, more efficient electric motors. In one implementation, the electric motor with lowest power output in the array can be modulated in its output power.

Regarding an electric motor array drive exemplary implementation, in some implementations motive power may be generated by a power source array 1302 comprised of small, fuel efficient, ICEs driving high voltage alternators. The outputs from the alternators may be combined and used to both provide energy for storage in energy storage 960 and input electrical power for electric motor controller 1304. The electrical output from energy storage 960 provides input power to the primary electric motor array and controllers 1304 which deploy a common rotor shaft assembly 1306 to deliver power to the primary load 1240, which consists of the conventional wheel drive system. While it may also address an implementation where, for example, the rear wheels are independently driven, it is not recommended because of the issues of torque steer when a power drive cuts in or out. This is a potentially dangerous mode of operation.

Although primary electric motor array and controllers 1304 can directly power the wheel drive system, which may include fixed ratio step down gearing, it is typically advantageous to include a variable ratio transmission on the output of primary electric motor array and controllers 1304. The variable ratio enables operation under conditions requiring high torque (such as standing start vehicle acceleration) without excessively high electric motor currents and at high speeds without excessively high electric motor RPM. A variable ratio transmission improves both performance and efficiency for many of the same reasons when used in a conventional vehicle power system.

The configuration of the electric motor sub-elements within the electric motor array may be "fine-tuned" by deploying a tapering of electric motor element sizes. One non-limiting example of a tapered configuration would be a binary progression such as 1 hp, 2 hp, 4 hp, 8 hp, 15 hp, 25 hp, 50 hp, which not only allows finer resolution load matching, but at lower output power levels, it provides much of said "typical" power from the smallest and most fuel efficient electric motors present. Other tapered configurations that allow for such "fine-tuning" are also possible. Furthermore, in an implementation involving an array of electric motors some or all having differing power outputs, it may be beneficial to vehicle performance to have the electric motor having the lowest power output in the array to be modulated in its output power.

In summary, the present invention involves the use of multiple small engines that combine their output power to obtain a specified average power capability. These small engines could all be the same size, but that may not be feasible in practice. The engines are not throttled up and down to achieve a needed total output power. Instead each of them is operated at its individual peak efficiency point and their different output powers are combined electrically to maintain the charge level in an energy storage system such as a battery. The energy storage system is then used to provide steady-state and surge power as required. For example, with a tapered array of small engines of 1, 2, 4, 8, 16, 32, 64, 128 hp, and each engine is either on at its peak efficiency point or it is off, energy output efficiency can be greatly increased relative to presently available mechanisms for powering vehicles. The present invention further comprises a digital control mechanism for the average power that is being made available to the energy storage system, and since an energy storage system is present, all of the power for acceleration comes from the battery and after one reaches a cruising speed in a vehicle, the load on the energy storage system decreases and the array turns on just enough of the small engines to return the battery to a specified charge level. Then, the array provides the steady state power and shuts down any engines not needed. The fundamental difference from what is presently available is a digital control operation rather than an analog throttling of an engine to achieve the desired power (regeneration is not excluded) for recharging of the energy storage system. Energy storage is an integral part of the systems presented herein. The prior art uses direct drive to the wheel drive system with no energy storage, and as a result, the various engines are required to be in operation all of the time or suffer disastrous transient performance degradation. Throttling of an engine causes a serious reduction in the efficiency of the engine at low power thereby losing the benefits of a multiple engine system by as much as 15:1. Throttling is deadly to efficient operation of an engine but it is easy to implement.

The foregoing descriptions of the preferred embodiments of the invention have been presented for the purposes of illustration and description only. They are not intended to be exhaustive or to limit the invention to the precise form(s) disclosed. Many modifications and variations are possible in light of the above teaching and in keeping with the spirit of the invention described herein. It is intended that the scope of the invention not be limited by this specification, but only by the claims and the equivalents to the claims appended hereto.

What is claimed is:

1. A gas-electric power delivery system comprising:
a means for storing energy;
an array of engines connected to an array of engine-powered electric alternators, wherein each engine powering its respective engine-powered electric alternator runs at a substantially constant RPM, the substantially constant RPM being that at which each engine achieves substantially peak efficiency; and
an array of electric drive motors, each electric drive motor having a power output capability wherein each electric drive motor is connected to a common shaft, and wherein the common shaft of the array of electric drive motors is connected to a mechanical load of varying power demand;
wherein the array of engine-powered electric alternators charges the means for storing energy in response to demands placed upon the array of electric drive motors by the mechanical load of varying power demand;
wherein each engine-powered electric alternator in the array of engine-powered electric alternators turns on and off sequentially, as needed, to maintain a charge on the means for storing energy, and wherein each engine-powered electric alternator directly powers the array of electric drive motors in response to demands placed upon the means for storing energy by the array of electric drive motors;
wherein each electric drive motor connected to the common shaft in the array of electric drive motors turns on and off, as needed, to meet the mechanical load of varying power demand; and,
wherein the electric drive motor having the lowest power output in the array of electric drive motors is modulated in its output power.

2. The gas-electric power delivery system of claim 1, wherein each engine-powered electric alternator in the array of engine-powered electric alternators possesses different electrical energy-producing capacity than the other engine-powered electric alternators in the array of engine-powered electric alternators.

3. The gas-electric power delivery system of claim 1, wherein the power output capability of each electric drive motor connected to the common shaft in the array of electric drive motors differs from the power output capability of the other electric drive motors in the array of electric drive motors.

4. The gas-electric power delivery system of claim 2, wherein the power output capability of each electric drive motor connected to the common shaft in the array of electric drive motors differs from the power output capability of the other electric drive motors in the array of electric drive motors.

5. The gas-electric power delivery system of claim 1, wherein each engine in the array of engines possesses different electrical energy-producing capacity than the other engines in the array of engines.

6. The gas-electric power delivery system of claim 5, wherein the electrical energy-producing capacity of the engines are tapered to provide a minimum number of engines that can account for all of the power demands of the mechanical load when at a steady state.

7. The gas-electric power delivery system of claim 1, wherein a majority of power from the means for storing energy is limited to an amount sufficient to provide full performance operation for 15 minutes or less.

\* \* \* \* \*